J. Wilson.
Mole Killer.

No. 97,742. Patented Dec. 7, 1869.

Witnesses;
A. W. Almquist
Alex F. Roberts

Inventor;
Jos. Wilson
per Munn & Co
Attys.

United States Patent Office.

JOSEPH WILSON, OF LITTLE FALLS, NEW JERSEY.

Letters Patent No. 97,742, dated December 7, 1869.

IMPROVED MOLE-KILLER.

The Schedule referred to in these Letters Patent and making part of the same.

*To all whom it may concern:*

Be it known that I, JOSEPH WILSON, of Little Falls, in the county of Passaic, and State of New Jersey, have invented a new and improved Mole-Killer; and I do hereby declare that the following is a full, clear, and exact description thereof, which will enable others skilled in the art to make and use the same, reference being had to the accompanying drawing, forming part of this specification.

Similar letters of reference indicate corresponding parts.

My invention has for its object to furnish a simple, convenient, and effective device for destroying moles, which shall be so constructed that it can be set without obstructing the track of the mole, and thus alarming him; and It consists in the construction and combination of the various parts of the device, as hereinafter more fully described.

A represents the outer case or box, which may be made of wood or other suitable material, which is open at both ends, and which should be about three feet in length, and about five inches square upon its inside.

B is the inner box, which fits loosely into the box or case A, which may be made of wood or other suitable material, and which should be about eighteen inches in length.

The box B is closed at its lower end, and is armed with a series of spikes, C, of suitable length.

When in use, the box B should be weighted with about six or eight pounds of stone, or other suitable weight.

To the upper end of the box B is attached a bail or loop, D, to catch upon an arm, E, attached to the shaft F, that works in notches in the upper edge of the outer case A.

Figure 1:
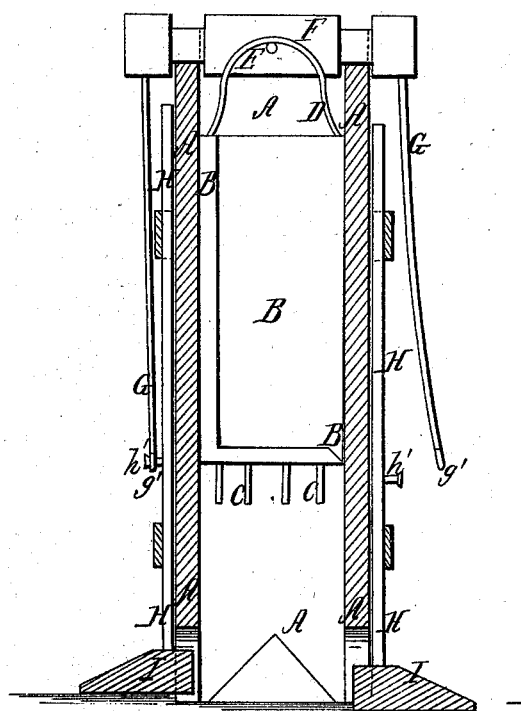
Figure 1 is a vertical section of my improved mole-killer.
Figure 2:
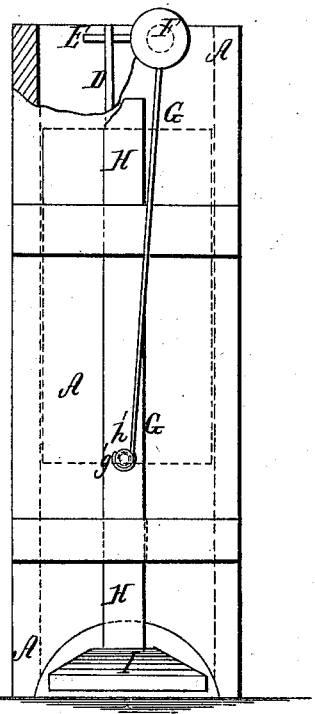
Figure 2 is a side view of the same, part being broken away to show the construction.

To the ends of the shaft F are attached elastic rods G, projecting at right angles to the line of the shaft F, and at right angles or nearly at right angles with the arm E, as shown in figs. 1 and 2.

The lower parts of the rods G are bent outward slightly, and upon their lower ends are formed hooks $g'$, to hook upon pins $n'$, attached to the sliding bars H. The bars H slide up and down in keepers, attached to the opposite sides of the outer case or box A, and to the lower ends of said bars H are attached feet I, as shown in figs 1 and 2.

In using the device, the drop or dead-fall B C D is hooked upon the arm E of the shaft F, and is held suspended by hooking the hooks $g'$, of the elastic rods G, upon the pins $h'$ of the sliding bars H. The device is then set upon the track of the mole, in such a way that the feet I of the sliding bars H may rest upon the track of the mole, and slightly depress but not obstruct said track, so that the mole, as he passes beneath the device, may raise the first sliding bar H, and release the rod G connected with said sliding bar, leaving the drop or dead-fall B C D supported by the other rod G.

The mole now passes directly beneath the drop or dead-fall B C D, and as he attempts to pass on, he raises the other sliding bar H, and disengages the other rod G, allowing the drop or dead-fall B C D to fall, driving the spikes C into him, and thus destroying him.

Having thus described my invention,

I claim as new, and desire to secure by Letters Patent—

The combination of the outer case or box A, inner box B, spikes C, bail or loop D, arm E, shaft F, elastic rods G $g'$, and sliding bars H $h'$ I, with each other, said parts being constructed and operating as herein shown and described, and for the purpose set forth.

The above specification of my invention signed by me, this 5th day of November, 1869.

JOSEPH WILSON.

Witnesses:
SAMUEL POPE,
H. C. HUDSON.